Figure 8:
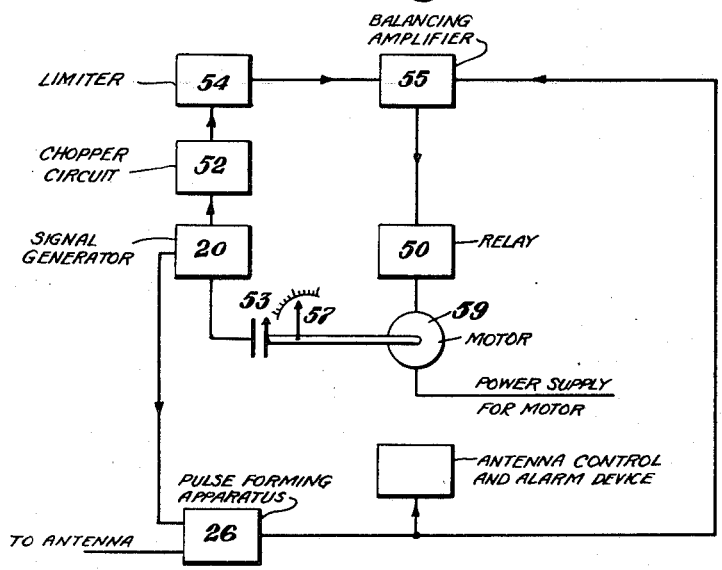

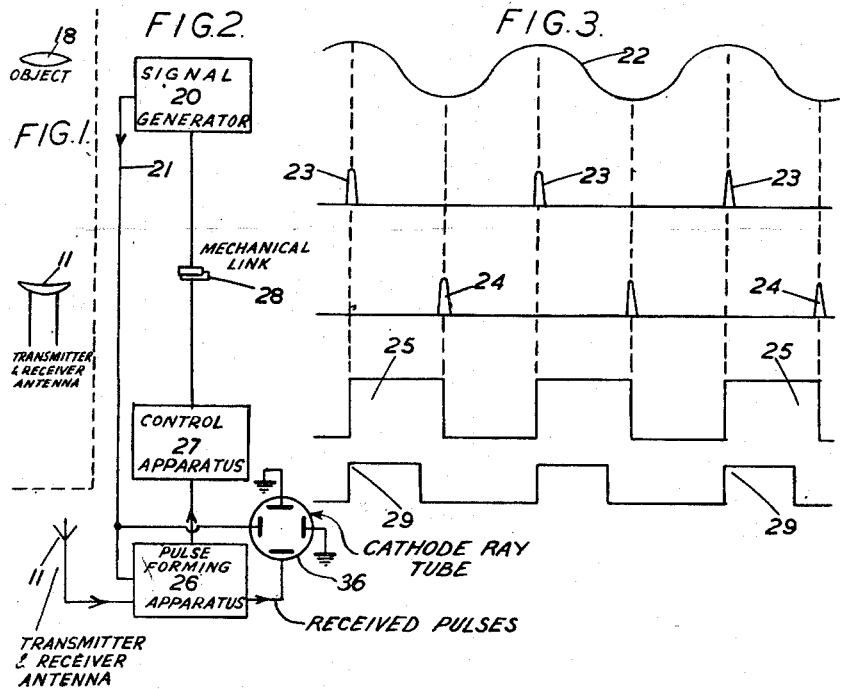

Feb. 27, 1951   W. A. BEATTY   2,542,983
ARRANGEMENT FOR DETERMINING DISTANCE BY
REFLECTION OF ELECTRICAL PULSES
Filed May 7, 1943   3 Sheets-Sheet 3

INVENTOR.
WILLIAM ARNOLD BEATTY
BY
ATTORNEY.

Patented Feb. 27, 1951

2,542,983

UNITED STATES PATENT OFFICE 2,542,983

ARRANGEMENT FOR DETERMINING DISTANCES BY REFLECTION OF ELECTRICAL PULSES

William Arnold Beatty, London, England, assignor, by mesne assignments, to International Standard Electric Corporation, New York, N. Y., a corporation of Delaware Application May 7, 1943, Serial No. 486,036
In Great Britain December 19, 1941

Section 1, Public Law 690, August 8, 1946
Patent expires December 19, 1961

9 Claims. (Cl. 343—7)

The present invention relates to arrangements for determining the distance between the radio transmitter transmitting electrical pulses and an object which reflects the pulses, said reflected pulses being received at the transmitter and the time elapsed between the transmission of a pulse and reception of the reflected pulse being a measure of the distance.

In radio location systems use is made of cathode ray tubes as time measuring devices. When cathode ray tubes are used in this manner it is necessary that they be associated with apparatus commonly known as a "timebase," which usually consists of a sawtooth wave form generator. It is desirable that such timebases maintain their accuracy over long periods and that it should not be necessary to recalibrate them when valve renewals are necessary. These conditions are not easily obtained in practice. A further disadvantage of the use of cathode ray tubes as time measuring devices is that constant visual observation is required on the part of the operator, which results in serious strain.

An object of this invention is to provide arrangements in which cathode ray tubes and timebases are not necessarily required for the measurement of the time elapsed between the transmission and reception of a signal such time being referred to herein as "elapsed time"; and also the provision of apparatus in which a visual indication of the distance of the object to be located may be obtained even when this distance is changing rapidly.

Another trouble experienced with radiolocation systems is that false indications can be given by nearby objects such as tall buildings or barrage balloons.

Another object of this invention is the provision of means such that false indications due to nearby objects are eliminated.

According to one aspect of the invention, in arrangements of the type specified the original transmitted pulses and the corresponding received reflected pulses are utilised to establish respective solid pulses whose duration depends upon the time elapsing between the transmission and reception of the said transmitted and received pulses and the said solid pulses are utilised to determine the distance to the object.

According to another aspect of the invention in arrangements of the type specified hereinbefore the transmitted pulses are short compared to the time of travel for the forward and return journey over the distances to be measured and the original transmitted pulses together with the received reflected pulses are utilised to establish longer pulses whose duration depends upon the time elapsing between the transmission of the short pulses and reception of the reflected pulses, and the said longer pulses are utilised to adjust the repetition period of the transmitted pulses so that the duration of the said longer pulses has a predetermined relation to the distance of the said object from the transmitter. One way of carrying this aspect of the invention into practice is one in which the duration of the said longer pulses has a predetermined relationship to the pulse repetition frequency, and this relationship may conveniently be that the duration of the longer pulses, that is the time elapsing between the transmission of a short pulse and the reception of the corresponding reflected pulse, is one half the pulse repetition period.

In another way of carrying out the invention the longer pulses may be integrated over a period to provide a voltage or current which may be used to control the repetition period of the transmitted pulses, or to give directly an indication of the distance of the object. In all the frequency arrangements, the repetition frequency of the transmitted pulses is a measure of the distance.

In another way of carrying out the invention the transmitted pulses may be of constant duration equal to half the period of the repetition frequency, but somewhat greater than the longest time elapsing between the transmission of a pulse and the reception of the corresponding reflected pulse likely to be experienced and at the receiver the transmitted and reflected pulses are combined and will thus overlap during a varying period depending upon the distance. These combined pulses are brought to a constant amplitude and integrated to give an indication of the distance. Alternatively the overlapping portion of the combined pulses, which is also variable in dependence upon the distance may be separated and integrated to give an indication of the distance. This overlapping portion will have a greater amplitude than the remainder and hence may be easily separated.

The invention will be better understood from the following description taken in conjunction with the accompanying drawings in which Figure 1 shows diagrammatically the antenna system in relation to the object the distance from the transmitter to which is to be measured.

Figure 2 shows in block schematic form the arrangements at the transmitter and

Figures 3, 4, 6, and 10 show several explanatory curves.

Figure 9:
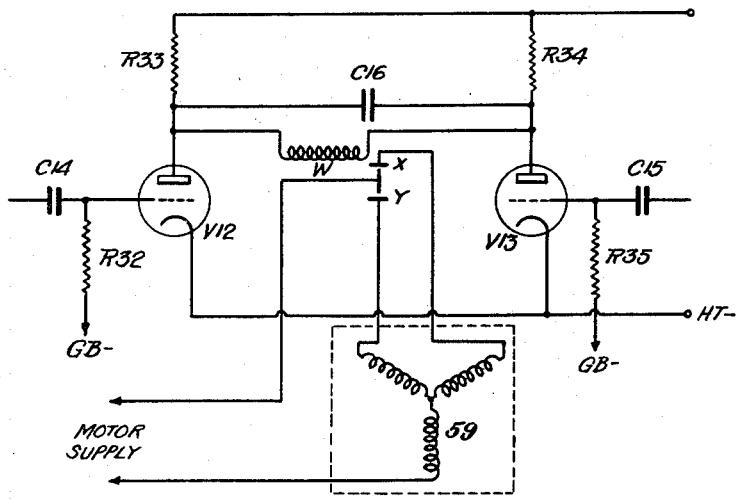
Figure 11:
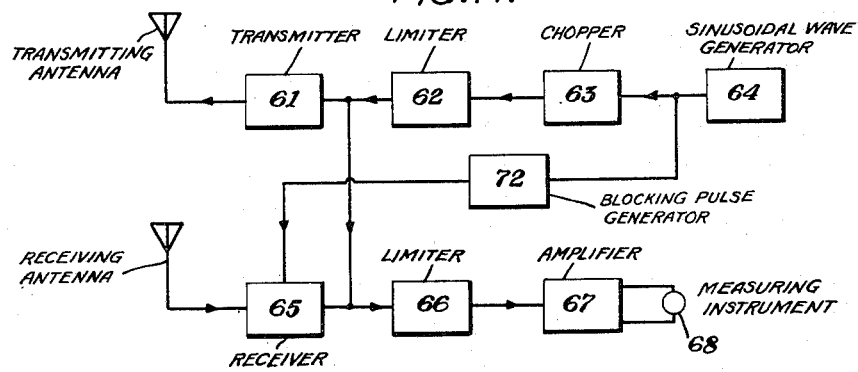
Figure 12:
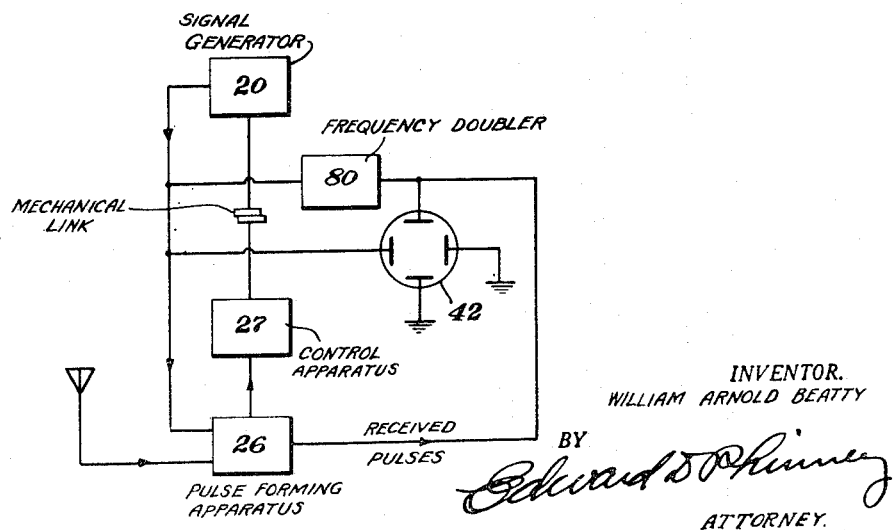

Figures 5 and 7 each show the luminous screen face of a cathode ray tube,

Figure 8 shows in block schematic form the control apparatus for varying the frequency of the signal generator, Fig. 9 is a circuit diagram of a balancing amplifier, Figs. 11 and 12 show in block schematic form two modified arrangements according to the invention.

Referring to the drawings assume that the object 18 Figure 1 is located at a distance of 3000 meters from the antenna 11. Referring to Figures 2 and 3 a signal generator 20 with output connections 21 generates a waveform 22 (Figure 3) having a frequency of 25,000 per second. Utilising the waveform 22 as a master control, short pulses 23 are generated, these pulses coinciding with the peaks of the waveform 22. Arrangements for generating such short pulses such as the multivibrator (or buzzer) and overload circuits are well known. The time interval between the successive pulses 23 is, in the case under consideration, 40 microseconds. The pulses 23 are utilised to energise radio apparatus which feeds into antenna 11 (Fig. 2). Pulses 24 reflected from object 18 are received on the antenna 11 also. Owing to the fact that the remote object 18 is 3000 metres from the antenna 11 the time elapsed between the transmission of a pulse and the reception of the corresponding reflected pulse is 20 microseconds, i. e. it is half the time interval between transmitted pulses.

The pulses 23 and 24 are utilised so as to establish a train of longer pulses 25, these pulses having a duration of 20 microseconds which is half the pulse repetition period.

The pulses 25 can be established by well-known means indicated at 26 Fig. 2 such as the well-known multivibrator trigger circuits arranged as a double stability device, as described in U. S. Patent 2,262,838 to E. M. Deloraine and A. H. Reeves. These pulses are taken as an output from the pulse forming apparatus 26 and fed to control apparatus 27, said control apparatus being so arranged that when the relationship between the duration of the longer pulses and the time interval between the transmitted pulses is other than that predetermined, the control apparatus operates to control the frequency of the signal generator until the said relationship is attained.

The control apparatus 27 is adjusted so that when the pulses 25 have a duration equal to half their repetition period, that is the pulses are switched "on" for the same duration as they are switched "off" no movement of the control apparatus 27 takes place. If however duration of the pulses 25 is greater than half their repetition period, i. e. they are "switched on" for a longer period than they are "switched off" the control apparatus 27 by means of the mechanical link indicated at 28 lowers the frequency of the signal generator 20. Alternatively if the duration of the pulses is less than half their repetition period, i. e. the "switched on" period of the pulse 25 is less than the "switched off" period, the control 27 moves in such a manner that the frequency of the wave form 22 is raised.

Assume that the object 18 moves in such a direction relative to the antenna 11 that the distance between them is increased i. e. it becomes greater than 3000 meters. The time elapsed between the transmission of a pulse and the reception of the reflected pulse is now increased, and the built-up pulses 25 no longer have equal on and off durations. The pulses 25 are now switched on for a longer period than they are switched off, and accordingly the control apparatus 27 lowers the frequency of the waveform 22. This lowering of frequency continues until such time as the new longer elapsed time is half that of the new lower frequency, and when this condition is reached movement of the control apparatus 27 ceases.

Alternatively if the object 18 should approach the antenna 11 the control would move in the opposite direction to that already indicated and movement would cease when the elapsed time was half that of the duration of a new higher frequency.

Since the time taken for the transmitted signal to reach the object 18 is half the elapsed time, it follows that the duration of one cycle of the waveform 22 is four times that of the time required for the transmitted signal to travel from the antenna 11 to the object 18, and therefore, the frequency of the generator 20 gives an available means for a direct indication of distance between the remote object and the transmitter receiver. For instance the dial of the frequency adjusting element usually associated with a signal generator such as the generator 20 can be calibrated in distance instead of frequency, or a distance scale can be fixed directly on the control apparatus 27.

It is important that the correct phasing of the pulses 25 be always maintained, that is to say, the switching on of the pulse must always in the case described occur at the time occurrence of the transmitted pulse. Definite phasing of the pulses 25 can be obtained by the use of a double stability trigger circuit since the arms of the circuit can be independently operated by the transmitted pulses on one side, and the received reflected pulses on the other. The longer pulses are obtained from the anode circuit of one of the two valves.

Fig. 8 shows a schematic diagram of the control apparatus 27. A portion of the output of the sinusoidal wave generator 20 is fed to a chopper circuit 52. The frequency of the generator 20 is varied by for example a rotatable condenser 53 the rotor of which is mechanically coupled to a reversible motor 59 controlled by a relay system 50. The output from the chopper 52 is fed to a limiting amplifier 54. The output from the limiter 54, which will have a wave form consisting of square pulses having a duration corresponding to half the period of a complete cycle of the source 20, is fed to one input of the balancing amplifier 55. The wave form 25, Fig. 3, from the output of the pulse forming apparatus 26 is fed to the other input of the balancing amplifier 55. A difference voltage is obtained in the output of 55 which reverses in sign or becomes zero according to whether the pulses from 26 are of longer or shorter duration or are equal to the pulses from limiter 54. The voltage is amplified by the circuit 55 if not zero and the output from 55 operates a relay system 50 causing the motor 59 to rotate the condenser 53 in such sense that the voltage difference across 55 tends to become zero in which condition the frequency of the generator 20 is such that the pulses from 26 and 54 are of equal duration.

The circuits of the generator 20, chopper 52 and the limiter 54 are so well-known in the radio art as to require no detailed description.

Fig. 9 shows circuit details of the balancing amplifier 55. The tube V12 is suitably biased via a grid leak R32 and the output of limiter 54, Fig. 8 is fed to its grid via a condenser C14. The tube V13 is suitably biased via a grid leak R35 and the output of 26, Fig. 8 is fed to its grid via condenser C15. The wave forms of current in the anode load resistances R33 and R34 will be equal if the time modulation of the wave forms from 54 to 26 are equal or provided that their average values over a short period of time are equal. The length of this time is governed by the time constant of R33, R34, C16. The energizing winding W of a polarized center zero relay with two sets of contacts $x$ and $y$ is bridged across R33 and R34, hence if the pulses from 26 are changed in duration in such sense that the output from 26 causes voltage across R34 to rise, current flows through the relay W from R33 and R34 and closes say contacts $x$ and the motor 59 is caused to run in such sense as to alter the duration of the pulses from the output of limiter 54 until the voltage across R33 is also increased by a like amount and the voltage balance is restored. The relay W then returns to its center position and cuts out the motor 59.

When the duration of the pulses from 26 alters in such sense that the voltage across R34 is reduced, the relay W closes contacts $y$ causing the motor 59 to rotate in the opposite direction to the former case to restore the balance. The frequency of the generator 20 may be indicated by a pointer and scale 57 or other suitable means which if properly calibrated will provide a direct reading of the distance. No difficulty should be experienced in determining distances within an accuracy of $\pm \frac{1}{4}$ of 1%. This accuracy should be maintained even down to relatively short distances.

Primarily the accuracy of the measurement is dependent upon the accuracy of calibration of the generator 20, but very little difficulty should be experienced in this connection as signal generators with stabilized outputs are readily available. Also simple means for checking the frequencies generated by such signal generators are well-known.

An advantage of the arrangement described using a trigger circuit is that no output can be obtained from the apparatus 26 unless the reflected pulses have sufficient amplitude to trigger the build-up circuit to produce the pulses 25. Thus random noise will not trigger the circuit and give a substantial output. The double stability trigger circuit receives a predetermined input amplitude before it will swing over from one position to the other. This feature, namely the achievement of a large output from the apparatus 26 when the reflected pulses reach a critical value, can be utilised so that auxiliary functions can be associated with the control apparatus. For instance matters can be so arranged that when an output is being obtained from the apparatus 26, the manual or other exploratory control used for steering the antenna structure while searching for an object could be automatically declutched or otherwise put out of gear, at the same time putting into gear more definite automatic antenna stearing system. Such automatic switching-over from exploratory searching to an automatic steering of the antenna 11 has important applications in cases where the object to be located is a ship at sea.

Another auxiliary function which can be performed by the apparatus 26 is that of giving audible or other suitable warning of the reception of reflected pulses.

As an alternative to the arrangements described hereinbefore, the waveform 22 may remain at a constant frequency each cycle of which has a duration somewhat longer than twice the longest elapsed time likely to be experienced. The pulses 25 are then built up adding the transmitted and received pulses which will overlap by varying amounts and the overlapping portion, or the full resultant pulse will have different durations and can be integrated to give directly a measure of the distance.

Figure 10:
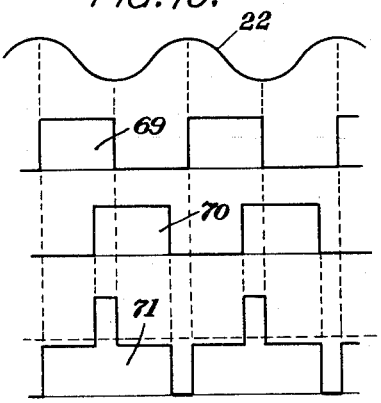

Fig. 10 consists of explanatory curves showing this alternative method, and Fig. 11 is a schematic diagram illustrating a system for applying this method. Waves 22 from a sinusoidal wave generator are passed through a chopping circuit 63 and limiter 62 to obtain constantly repetitive pulses 69 which are applied to a radio transmitter 61 to modulate a carrier wave which is radiated by a transmitting antenna. Reflected waves picked up by a receiving antenna are received by a radio receiver 65 and the received pulses 70 are combined with the pulses 69 to form overlapped pulses having a wave form as shown at 71. The combined pulses are brought to a constant amplitude by a limiter 66 and integrated by an amplifier 67. An indicating instrument 68, such as a voltmeter or ammeter in the output circuit of 67, if properly calibrated will give a measure of the power in the pulses and therefore of the distance of the object. Alternatively the limiter 66 may be adjusted to cut off the overlapping tops of the pulses 71 as shown by the broken line in Fig. 10. The duration of these tops will be a measure of the distance of the reflecting object. All the elements shown in Fig. 11 are of well-known construction in the radio field and their application for the purposes of the present invention will be clearly understood by those versed in the art.

The arrangements according to the present invention lend themselves easily for eliminating false readings due to the presence of nearby objects.

Assume that in the case of aeroplane location, barrage balloons can be flown up to 1000 metres high, and that it is desired to use the arrangements hereinbefore described in conjunction with an anti-aircraft gun predictor. Under such circumstances it can reasonably be expected that the aeroplane will fly higher than the balloon barrage and the elapsed time for signals reflected from the barrage will be less than that from the aeroplane. If the lowest elevation for the gun when it is fired be 30°, then the greatest effective distance which would be obtained between a gun and any barrage balloon flying at 1000 metres high would be 2000 metres, and it follows that with arrangements as hereinbefore described located close to the gun and taking bearings at 30° elevation, the maximum elapsed time for reflected signals from the balloon barrage would be 13.3 microseconds.

Under such circumstances false readings due to the balloon barrage may be eliminated by rendering all receiving apparatus inoperative for a definite period. Referring to Fig. 3 a train of pulses 29 has a duration of 14 microseconds and a repetition frequency similar to that of the pulses 23. The leading edges of the pulse 29 coincide with the time of occurrence of the pulses 23. There are many arrangements well known to those skilled in the art, of generating such a train of pulses 29, having the desired relationship to the pulses 23, for example, a double triode multivibrator circuit arrangement having one stable position and a suitable time constant, in conjunction with a trigger circuit to which the pulses 23 are applied. Such arrangements are disclosed for example in U. S. Patent No. 2,262,838 and require no further description.

The pulses 29 from the blocking pulse generator 72, Fig. 11 are utilised to block one or more circuits in the receivers and/or control apparatus associated with the receiving antenna system in any well-known manner such as, for example, by the application of a blocking bias to the grid of one or more of the tubes as is common in voice operated switching arrangements for telephone repeaters. Therefore for an interval of 14 microseconds following the transmission of a pulse signal, all the apparatus is made insensitive to reflected pulses, and since pulses having an elapsed time greater than 14 microseconds are due to objects higher than the balloon barrage it follows that false readings due to nearby objects are eliminated.

Suitable indicating arrangements, particularly for indicating when the correct frequency of the transmitted pulse has been obtained will now be described with reference to Figures 2, 4 and 5, 6 and 7.

Referring to Figure 4, a waveform 30 of potentially variable frequency is utilised to control the generation of transmitted pulses 33, said pulses coinciding with the positive peaks 31 of the waveform 39 as hereinbefore described with reference to wave 22 and pulse 23 in Figure 3. When the duration of one cycle of the wave form 30 is equal to twice the elapsed time of the reflection pulses 34 from the moving object, said pulses 34 coincide with the negative peaks 32 of the waveform 30. The waveform 30 is also utilised to establish the trace 35 on the screen face of the cathode ray tube 36 Figures 2 and 5 by connecting the source 20 to the horizontal deflecting plates. The left hand side of the trace corresponding to the positive peak of the waveform 30. The received reflected pulses 34 are utilised to deflect the beam in a direction transverse to that of the scanning due to the waveform 30 by applying them to the vertical deflecting plates.

When the waveform 30 has a duration equal to twice the elapsed time the reflected pulses 34 will deflect the beam giving a vertical trace 37 at the extreme right hand end of the trace 35. Should the waveform 30 have a duration other than twice the elapsed time the vertical trace due to the pulses 34 will take up some other position, such as that shown at 38. It will thus be seen that in order to obtain an indication of the distance of the remote object setting up the reflected signals, it is only necessary to vary the frequency of the waveform 30 so that the vertical trace 37 always appears at the extreme right hand end of the trace 35, or at other predetermined positions for different relationships between the duration of the longer pulses and the repetition period of the transmitted pulses.

An alternative indicating arrangement using a cathode ray tube will be understood by referring to Figures 6, 7 and 12.

Two waveforms 39 and 40 are established, the wave form 40 having twice the frequency of the waveform 39 and being phased so that every second positive half cycle of the waveform 40 commences at the same time as the commencement of a positive half cycle of the waveform 39. These two waveforms are used to establish in a known manner the looped trace 41 on the screen face of the cathode ray tube 42 Figure 7. If the frequency of the waveform 39 is such that when transmitted pulses coincide with the positive peaks 43 of said waveform as already described and reflected pulses coincide with the instants 44, and if, further, said reflected pulses 34 are utilised to deflect the beam in the same direction as the waveform 40, then the vertical trace 45 due to said deflection will occur at the crossover of the looped trace 41. This condition is obtained when the duration of one cycle of the wave form 39 is four times the elapsed time, i. e. it is eight times the time taken for a signal to travel from a transmitter to the remote object setting up the reflected signals.

As shown in Fig. 12 waves of the form 39 from the signal generator 20 are applied to the horizontal deflector plates of the cathode ray tube 42 whilst waves of the form 40 from the output of a frequency doubler 80 are applied to the vertical deflector plates of the tube. The received reflected pulses 34 are also applied to the vertical deflector plates.

An advantage of the cathode ray tube arrangement described is that sharp focusing of the cathode ray tube beam is necessary over only a small portion of the tube face, since the critical observations are always made at one place. This eases the tolerances required for the manufacture of such tubes.

The cathode ray tube arrangement for making observations may be found useful when the reflected signals are very weak, or are scattered due to various causes.

A further advantage of the cathode ray tube arrangement is that the signal generator which generates the control waveform is the only piece of apparatus which requires accurate calibration.

What is claimed is:

1. Arrangement as claimed in claim 4 wherein the repetition frequency of the transmitted pulses is adjusted so that the time elapsing between the transmission of a pulse and the reception of the corresponding reflected pulse from the object is one half the time interval between transmitted pulses.

2. Arrangement as claimed in claim 4 wherein blocking means are provided for rendering said receiving means inoperative for a definite period following the transmission of each pulse whereby false indications due to substantially fixed obstacles in the vicinity, e. g. barrage balloons, are eliminated.

3. System for the determination of distance by electromagnetic waves according to claim 8 wherein said indicating means comprises means for integrating said pulsations over a period of time for obtaining an electrical quantity which varies with the duration of said pulses and a measuring instrument for indicating the magnitude of said electrical quantity.

4. System for the determination of distance by electromagnetic waves comprising a source of high frequency carrier waves, a source of electrical pulses, means for modulating said carrier waves with said electrical pulses, means for radiating said modulated carrier waves, receiving means for receiving said modulated carrier waves after reflection by an object, means for deriving electrical pulses from said received modulated carrier waves, means for deriving jointly from said received pulses and from pulses directly derived from said source of electrical pulses pulsations having a duration depending upon the time elapsing between the transmission and reception of a pulse, controlling means for adjusting the pulse frequency of said source of electrical pulses, means actuated by said pulsations for actuating said controlling means so that the duration of said pulsations has a predetermined relation to the distance of the object, and means for indicating the frequency of said generator to provide a distance reading.

5. System for the determination of distance by electromagnetic waves according to claim 4, further comprising a cathode ray tube having two beam deflecting systems, means for applying waves from said source of electrical pulses to one of said deflecting systems and means for applying said received reflected pulses to said other deflecting system.

6. System for the determination of distance by electromagnetic waves according to claim 4, further comprising a cathode ray tube having two beam deflecting systems, means for applying waves from said source of electrical pulses to one of said deflecting systems, means for applying waves of double the frequency of said source to the other deflecting system, and means for applying said received reflected pulses to one of said deflecting systems.

7. System for the determination of distance by electromagnetic waves comprising a wave generator, adjusting means for varying the frequency of said wave generator, means for producing electrical pulses from the waves from said generator, a source of high frequency carrier waves, means modulating said carrier waves with said electrical pulses, means for radiating said modulated carrier waves, receiving means for receiving said modulated carrier waves after reflection by an object, means for deriving electrical pulses from said received modulated carrier waves, means for deriving jointly from said received pulses and from pulses directly derived from said first-mentioned means for producing electrical pulses pulsations having a duration depending upon the time elapsing between the transmission and reception of a pulse, means for producing from said wave generator electrical pulses having a duration equal to one half the period of a wave cycle of said generator and of the same frequency as said generator, means for comparing the duration of said last-mentioned pulses with the duration of said pulsations, means for deriving from said pulses an electrical quantity dependent upon the difference between said durations, control means for actuating said adjusting means for varying the frequency of said wave generator, means for applying said electrical quantity to said control means, and means for indicating the frequency to which said wave generator is adjusted.

8. System for the determination of distance by electromagnetic waves comprising a source of high frequency carrier waves, a source of control waves having a frequency determining portion tuned to a frequency of lower order than said carrier waves, means for deriving unidirectional electrical pulses of related frequency from said lower frequency source, means for modulating said carrier waves with said electrical pulses, means for radiating said modulated carrier waves, means for receiving said modulated waves after reflection by an object, means for detecting the modulating pulses, means for deriving jointly from said detected pulses and pulses transmitted directly from said source pulsations having a duration depending upon the time elapsing between the transmission and reception of a pulse, indicating means, means for varying said frequency determining portion in accordance with the duration of said pulsations, and means for controlling said indicating means by said pulsations for obtaining an indication of the distance of the object.

9. System for the determination of distance by electromagnetic waves comprising a source of high frequency carrier waves, a second source of unidirectional electrical pulses of variably predetermined repetition frequency and duration, means for modulating said carrier waves with said electrical pulses, means for radiating said modulated carrier waves, receiving means for receiving said modulated carrier waves after reflection from an object, the order of magnitude of the elapsed time of said reflection being a factor in the predetermination of the electrical constants of said second source, means for deriving unidirectional electrical impulses from said received modulated carrier waves, means connected directly both to said receiving means and to said second source for deriving pulsations having a duration dependent upon the elapsed time between the instants of transmission and reception of a pulse indicating means, means for controlling said indicating means by said pulsations for obtaining an indication of the distance of the object, and means operable in response to said indicating means to vary the repetition frequency of said pulsations.

WILLIAM ARNOLD BEATTY.

REFERENCES CITED

The following references are of record in the file of this patent:

UNITED STATES PATENTS

| Number | Name | Date |
|---|---|---|
| 1,585,591 | Lowy | May 18, 1926 |
| 1,924,174 | Wolf | Aug. 29, 1933 |
| 2,055,883 | Terry | Sept. 29, 1936 |
| 2,183,399 | Heising | Dec. 12, 1939 |
| 2,333,688 | Shepard | Nov. 9, 1943 |
| 2,391,411 | Goble | Dec. 25, 1945 |
| 2,403,527 | Hershberger | July 9, 1946 |
| 2,404,527 | Potapenko | July 23, 1946 |

FOREIGN PATENTS

| Number | Country | Date |
|---|---|---|
| 469,417 | Great Britain | July 26, 1937 |